US 9,227,282 B2

(12) United States Patent
Fronius et al.

(10) Patent No.: US 9,227,282 B2
(45) Date of Patent: Jan. 5, 2016

(54) MACHINE TOOL FOR ROTARY MACHINING

(75) Inventors: Jürgen Fronius, Walheim/Neckar (DE); Michel Soquet, Choisy (FR); Rémi Mugnier, Seynod (FR); Karl-Heinz Braun, Hessigheim (DE)

(73) Assignees: KOMET GROUP GMBH, Besigheim (DE); MACHINES SERDI S.A., Annecy (FR)

( * ) Notice: Subject to any disclaimer, the term of this patent is extended or adjusted under 35 U.S.C. 154(b) by 555 days.

(21) Appl. No.: 13/699,512

(22) PCT Filed: May 23, 2011

(86) PCT No.: PCT/EP2011/058345
§ 371 (c)(1),
(2), (4) Date: Feb. 21, 2013

(87) PCT Pub. No.: WO2011/147770
PCT Pub. Date: Dec. 1, 2011

(65) Prior Publication Data
US 2013/0195574 A1    Aug. 1, 2013

(30) Foreign Application Priority Data
May 25, 2010    (DE) .......................... 10 2010 029 288

(51) Int. Cl.
*B23Q 5/32*    (2006.01)
*B23Q 1/54*    (2006.01)
(Continued)

(52) U.S. Cl.
CPC ................ *B23Q 1/545* (2013.01); *B23C 3/055* (2013.01); *B23Q 1/5462* (2013.01);
(Continued)

(58) Field of Classification Search
CPC .................................... B23Q 5/32; B23C 1/12
USPC ........ 409/231, 201, 211; 408/181, 57, 59, 82, 408/80, 135, 236
See application file for complete search history.

(56) References Cited

U.S. PATENT DOCUMENTS 1,506,154 A * 8/1924 Hansen et al. ............. 144/117.3
2,788,718 A * 4/1957 Martellotti .................... 409/102
(Continued)

FOREIGN PATENT DOCUMENTS

DE    28 08 610 A1    10/1978
DE    43 07 351 A1    9/1994
(Continued)

OTHER PUBLICATIONS

International Search Report for PCT/EP2011/058345 (2 pages).
(Continued)

*Primary Examiner* — Daniel Howell
*Assistant Examiner* — Chwen-Wei Su
(74) *Attorney, Agent, or Firm* — Flynn, Thiel, Boutell & Tanis, P.C.

(57) ABSTRACT

A machine tool has a mechatronic assembly which has a machine spindle and has a tool head which is held on the machine spindle and which has a basic body and also at least one working slide, which is adjustable relative to the basic body, for holding a tool. The mechatronic assembly contains an electric adjusting motor which acts on the working slide. The machine tool has a support device which holds the mechatronic assembly and which has an articulated joint arrangement at which the mechatronic assembly can be pivoted at least about a first axis and about a second axis which differs from the first axis.

41 Claims, 3 Drawing Sheets

(51) Int. Cl.
*B23C 3/05* (2006.01)
*B23Q 11/00* (2006.01)

(52) U.S. Cl.
CPC ............ *B23Q 11/001* (2013.01); *Y10T 408/45* (2015.01); *Y10T 409/30784* (2015.01); *Y10T 409/307672* (2015.01); *Y10T 409/308232* (2015.01); *Y10T 409/309352* (2015.01)

(56) References Cited

U.S. PATENT DOCUMENTS

| | | | | |
|---|---|---|---|---|
| 2,823,591 | A | * | 2/1958 | Craddock et al. ............. 409/190 |
| 3,710,659 | A | * | 1/1973 | Pagella et al. .................... 82/1.2 |
| 5,769,576 | A | * | 6/1998 | Gerard et al. ................ 408/83.5 |
| 5,807,037 | A | * | 9/1998 | Schneider et al. ............ 408/147 |
| 5,829,928 | A | * | 11/1998 | Harmand et al. ............ 408/83.5 |
| 7,074,360 | B2 | | 7/2006 | Wolven |
| 2003/0100248 | A1 | | 5/2003 | Gruber et al. |

FOREIGN PATENT DOCUMENTS

| | | |
|---|---|---|
| DE | 297 24 877 U1 | 1/2005 |
| DE | 10 2005 050 754 | 1/2007 |
| DE | 60 2004 004 201 T2 | 10/2007 |
| EP | 1 314 501 A1 | 5/2003 |
| FR | 2 735 409 A1 | 12/1996 |
| FR | 2 832 658 | 5/2003 |
| WO | WO 96/07501 | 3/1996 |

OTHER PUBLICATIONS

Search Report of Corresponding German Application 10 2010 029 288.5 (4 pages).

European Office Action dated Jul. 3, 2014 (5 pages).

\* cited by examiner

MACHINE TOOL FOR ROTARY MACHINING

FIELD OF THE INVENTION

The invention relates to a machine tool for rotary machining, especially for machining valve seats on cylinder heads, with a mechatronic assembly which has a machine spindle, with a tool head mounted on the machine spindle, which tool head has a basic body and also at least one working slide, which is adjustable relative to the basic body, for the mounting of a tool, with an electric adjusting motor acting upon the working slide, and with a carrier device which accommodates the mechatronic assembly.

BACKGROUND OF THE INVENTION

Such a machine tool is known from FR 2 832 658 A1. This machine tool comprises a mechatronic assembly. The mechatronic assembly of the machine tool is accommodated on a carrier device. The mechatronic assembly includes a tool head. The tool head is connected to a machine spindle with a rotational axis. The tool head is designed with a guide pin. The tool head has an adjustable holder unit on which a cutting tool is fastened. For adjusting the holder unit, the mechatronic assembly includes an adjusting motor. With regard to the rotational axis of the machine spindle, the adjusting motor is arranged in the mechatronic assembly in a manner in which it is offset to the side on the tool head-side end of the machine spindle. The adjusting motor and the holder unit for the cutting tool are coupled by means of a planetary gearing. For the machining of valve seats, the guide pin of the tool head is inserted into a valve bore. After that, the tool head is set in rotational motion by driving the machine spindle. The cutting tool then rotates around the rotational axis of the machine spindle. The arrangement of the adjusting motor has the result that in the machine tool the mass center of gravity of the mechatronic assembly lies close to the tool head of the arrangement. For adjusting the mechatronic assembly in the machine tool, high force moments are therefore necessary. Furthermore, the side arrangement of the adjusting motor with regard to the rotational axis of the machine spindle results in an asymmetrical heat transfer into the tool head. This leads to inaccuracies in the tool adjustment.

OBJECT OF THE INVENTION

Using this as the starting point, the invention is based on the object of providing a machine tool with a mechatronic assembly, especially for the remachining of valve seats on cylinder heads, which enables an adjustment of the mechatronic assembly with little expenditure of force and which ensures very high levels of machining accuracy.

SUMMARY OF THE INVENTION

This object is achieved with a machine tool in which the carrier device comprises an articulated arrangement on which the mechatronic assembly can be pivoted at least around a first axis and around a second axis which differs from the first axis, wherein the adjusting motor is positioned in the mechatronic assembly in such a way that the weight force $F_V$ of the adjusting motor at least partially compensates that torque which the weight force $F_G$ of the tool head induces when the mechatronic assembly is being pivoted around the first axis and/or around the second axis.

One fundamental idea of the invention is to mount a mechatronic assembly, with a displaceable cutting tool, in an articulated arrangement in a machine tool so that the mass center of gravity of the mechatronic assembly is located close to, or on, a rotational axis of the articulated arrangement. Another fundamental idea of the invention is to arrange the adjusting motor for a working slide in the mechatronic assembly at a distance from the tool head so that an undesirable heat transfer from the adjusting motor into the tool head is avoided.

It is advantageous if the mechatronic assembly has an electric spindle motor which drives the machine spindle and comprises a rotor which is rotatably coupled to the machine spindle. The machine spindle can have a hollow shaft geometry. The adjusting motor then favorably has a rotor which acts upon the working slide, wherein the rotational axis of the rotor of the spindle motor and the rotational axis of the rotor of the adjusting motor align with the rotational axis of the machine spindle.

It is also advantageous if the machine spindle, by at least a first pivot bearing and a second pivot bearing, is supported in a housing which is preferably designed as a quill and is connected in a rotation-resistant manner to the stator of the spindle motor, wherein the spindle motor acts upon the machine spindle between the first pivot bearing and the second pivot bearing.

For the displacement of the mechatronic assembly in the direction of the rotational axis of the machine spindle, the housing has an operating section which is preferably designed as a toothed rack. For the transmission of energy and data, a primary coil is fastened on the housing and together with a secondary coil, which is positioned on the holder, forms an inductive transmission path for energy and data.

By the adjusting motor being arranged on the side of the spindle motor which faces away from the tool head, the locating of the mass center of gravity of the mechatronic assembly in the region of the articulated arrangement can be achieved.

It is favorable to design the machine spindle as a hollow spindle through which passes a drive shaft, which is rotatably coupled to the rotor of the adjusting motor, for the movement coupling of working slide and adjusting motor. In this way, high levels of torque can be transmitted via the machine spindle with low dead weight.

In a development of the invention, the adjusting motor acts upon the working slide in the adjusting direction via gearing means which are connected to the drive shaft. The gearing means can comprise a conversion gear, for example, arranged in the tool head, which converts a rotational movement of the rotor of the adjusting motor into a linear movement of the working slide. The gearing means can especially comprise a reduction gear, preferably designed as a planetary gearing or harmonic drive, which converts the rotational movement of the rotor of the adjusting motor. This reduction gear can also be arranged in the tool head. It is also possible, however, to position the reduction gear between the adjusting motor and the drive shaft.

It is favorable to arrange the stator of the adjusting motor in a stationary manner relative to the machine spindle.

By provision of an opening of window-like design for a function channel in the machine spindle, which is designed as a hollow spindle, electrical leads and fluid lines can be routed to the tool head.

It is advantageous to arrange the adjusting motor on a holder which is fastened on the machine spindle and has a rotary lead-through for a function channel which opens into a function channel which extends preferably in a wall or recess of the holder. The mechatronic assembly preferably has at least one function channel for fluid, especially a function channel for cooling lubricant and/or a function channel for electrical leads for transmission of energy and/or data to the tool head. This function channel can be designed as a pipeline or hoseline, for example, which is fixedly mounted in the mechatronic assembly and movable with the machine spindle. Of particular advantage is an electrical lead for transmitting a tool position to the tool head. It is advantageous if the function channel has coupling elements for the connecting of function channel sections. This measure enables a modular construction of the mechatronic assembly and a simple exchange of worn parts.

The drive shaft can also be formed with at least one function channel for fluid, especially a function channel for cooling lubricant and/or with electrical leads for transmission of energy and data. In order to reduce inertia moments and weight, it is favorable to design the drive shaft as a hollow shaft.

The articulated arrangement is favorably designed as a ball joint with a ball center around which the mechatronic assembly can be pivoted. The mass center of gravity of the adjusting motor in the mechatronic assembly is then arranged on a side of the ball center which faces away from the tool head. By this ball joint having a joint body, which is supported in an air bearing, a hydrostatic bearing or a magnetic bearing, the mechatronic assembly can move accurately without expenditure of force or with only very little expenditure of force. Preferably, the articulated arrangement in the machine tool is a ball joint with air cushions, which is suitable for self-alignment, as is described in EP 0 833 711 B1, for example. Provision can be made in the machine tool for means for the clamping and/or locking of the articulated body of the ball in the bearing. The articulated arrangement can favorably be displaced horizontally and/or vertically in the carrier device.

For aligning the rotational axis of the machine spindle, the tool head comprises a guide pin which acts as a centering pin and which aligns with the rotational axis of the machine spindle. This enables the self-activating, automatic alignment of the machine spindle of the machine tool with the axis of a bore or with the axis of the opening on a valve seat in a cylinder head.

It is advantageous to provide a rotary transducer in the mechatronic assembly, which senses the rotational speed of the machine spindle, and/or to integrate a position transducer in the mechatronic assembly, which senses the position of the working slide.

For holding the cylinder head of an internal combustion engine, the machine tool includes a chucking device. The mechatronic assembly preferably includes a rotary distributor. This enables the controllable distribution of fluid to various function channels.

The invention is explained in more detail in the following text based on the exemplary embodiment which is schematically represented in the drawing.

DETAILED DESCRIPTION OF THE INVENTION

Figure 1:
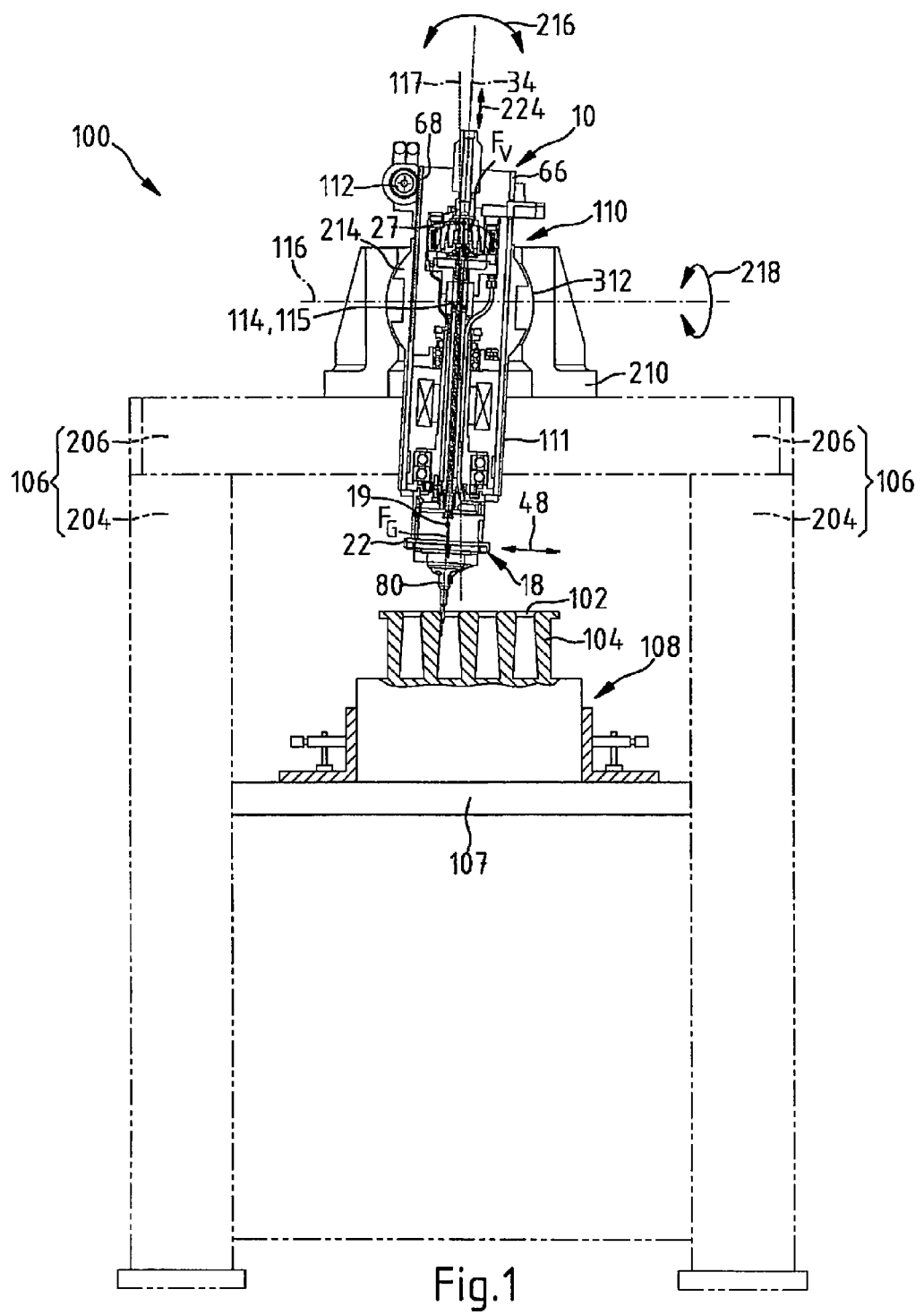
FIG. 1 shows a machine tool for the remachining of valve seats, with a mechatronic assembly which comprises a tool head.

The machine tool 100 in FIG. 1 has a chucking device 108 for the cylinder head 104 of an internal combustion engine.

The machine tool 100 includes a mechatronic assembly 10. The mechatronic assembly 10 has a tool head 18 with a cutting tool. The mechatronic assembly is located in a sleeve 111. The mechatronic assembly 10 is guided in the sleeve 111 in a linearly movable manner. Together with the sleeve 111, the mechatronic assembly 10 is mounted on a carrier device 106. The carrier device 106 comprises a machine base 206. The machine base 206 is a support for a guide block 210. The guide block 210 carries an articulated arrangement 110 for the mechatronic assembly 10. The articulated arrangement 110 is designed as an air cushion-supported ball joint 110. The ball joint 110 has a joint shell 312 which is formed in the guide block 210. The sleeve 111 for the mechatronic assembly 10 has a joint body 214. This joint body 214 has a spherical surface contour. The carrier device 106 is constructed as a portal. The carrier device 106 has support pillars 204 which support the machine base 206.

On the machine base 206, the guide block 210 can be moved horizontally on an air cushion in two spatial directions. The guide block 210 together with the articulated arrangement 110 of the mechatronic assembly 10 can therefore be displaced virtually free of force on the machine base 206 in the horizontal plane.

The air cushion in the ball joint 110 is controllable. The air cushion acts as an air bearing. The ball joint 110 has a center of rotation 114. With the air bearing engaged, the mechatronic assembly 10 together with the sleeve 111 can be pivoted in the air-supported ball joint 110, corresponding to the double arrow 216, around a horizontal axis 115 which intersects the center of rotation 114, and, corresponding to the double arrow 218, can be moved around the horizontal axis 116 which intersects the center of rotation 114, and can also be rotated around the vertical axis 117 which intersects the center of rotation 114.

The mechatronic assembly 10 comprises a tool head 18 with a cutting tool. The tool head 18 has a guide pin 80. This guide pin 80 serves for the exact positioning of the cutting tool on a valve seat.

The machine tool 100 has an adjustable table 107 with a chucking device 108 for the cylinder block 104 of an internal combustion engine with a valve seat, or a plurality of valve seats 102.

The mechatronic assembly 10 comprises a housing 66 which is designed as a quill. This quill has an operating section 68, designed as a toothed rack, for a drive unit 112. The drive unit 112 is mounted on the sleeve 111. By means of the drive unit 112, the mechatronic assembly 10 can be moved in the sleeve 111, corresponding to the double arrow 224.

Figure 2:
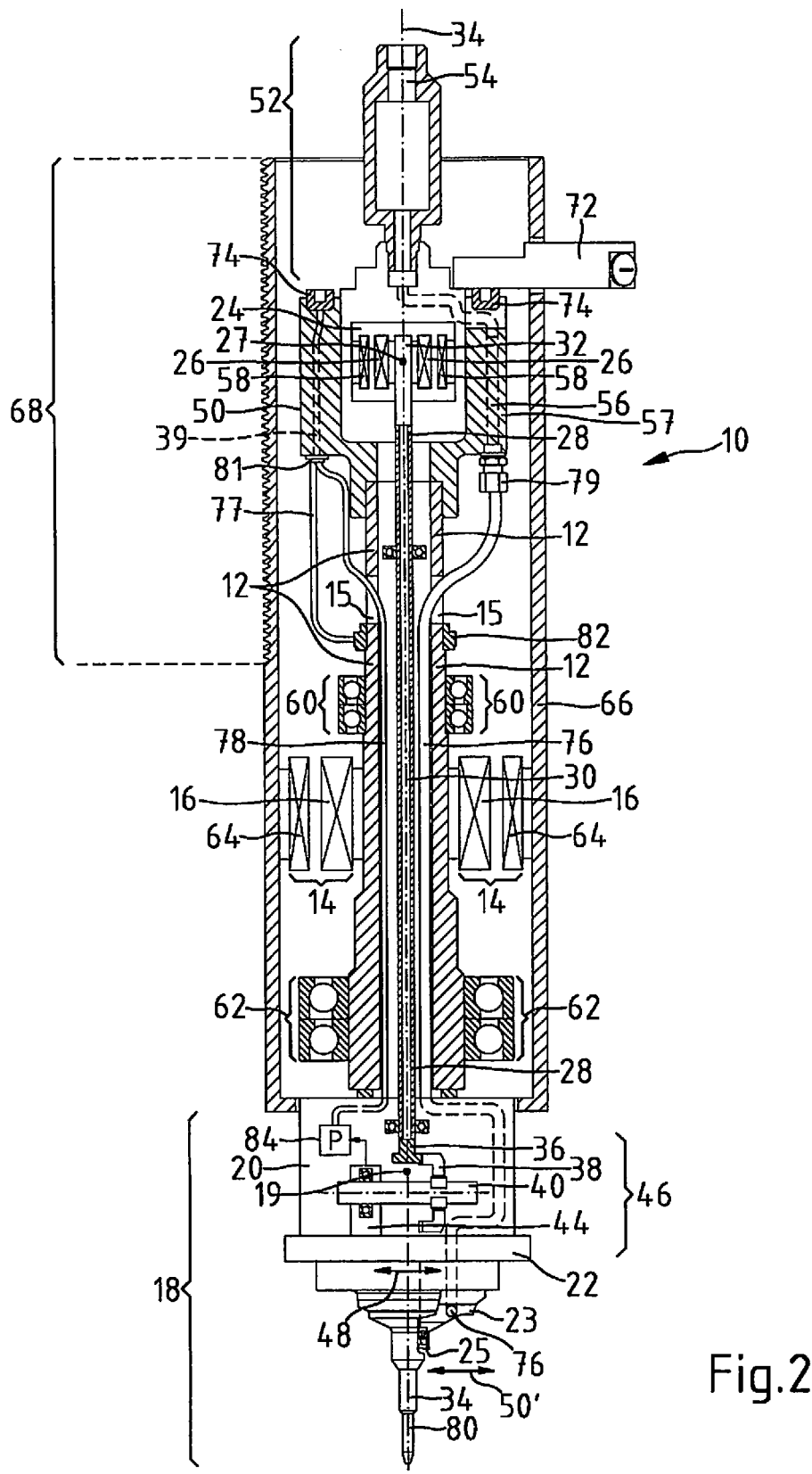
FIG. 2 shows the mechatronic assembly with the tool head.

FIG. 2 shows the machine assembly 10 in the machine tool 100 in detail. The mechatronic assembly 10 includes a machine spindle 12. The machine spindle 12 has a rotational axis 34. The tool head 18 is connected to the machine spindle 12. The tool head 18 carries a cutting tool 25. For driving the machine spindle 12, there is a spindle motor 14 in the mechatronic assembly 10. The spindle motor 14 is accommodated in the housing 66 of the mechatronic assembly 10. By means of the spindle motor 14, the tool head 18 together with the cutting tool 25 can be moved in a rotating manner.

The cutting tool 25 on the tool head 18 is adjustable. For this purpose, the cutting tool is fastened on a working slide 22 in the tool head. The working slide 22 can be moved in a linear guide in a basic body 20 of the tool head 18. An electric adjusting motor 24 is associated with the working slide 22. The adjusting motor 24 has a mass center of gravity 27. The adjusting motor 24 is accommodated in a rear section of the mechatronic assembly 10. This section of the mechatronic assembly 10 faces away from the tool head 18. The adjusting motor 24 is located on the side of the center of rotation 114 of the articulated arrangement 110 which faces away from the tool head 18. The effect of this is that the weight force $F_V$ of the adjusting motor 24, acting at its center of gravity 27, at least partially compensates that torque which the weight force $F_G$ of the tool head 18, acting at the center of gravity 19 of said tool head 18, induces when the mechatronic assembly 10 is pivoted around the center of rotation 114.

As FIG. 2 shows, the machine spindle 12 is supported by a first pivot bearing 60 and a second pivot bearing 62 in the housing 66 of the mechatronic assembly 10. For driving the machine spindle 12, the mechatronic assembly includes a spindle motor 14. The spindle motor 14 has a rotor 16 which is rotatably coupled to the machine spindle 12. The stator 64 of the spindle motor is fastened in the housing of the mechatronic assembly 10. The machine spindle 12 is a hollow spindle.

The adjusting motor 24 has a rotor 26, the rotational axis 32 of which aligns with the rotational axis 30 of the rotor of the spindle motor 14. The rotor 26 of the adjusting motor 24 is connected in a rotation-resistant manner to a drive shaft 28 for moving the working slide 22. The drive shaft 28 is a hollow shaft which passes through the machine spindle 12. The stator 58 of the adjusting motor 24 is fastened in a holder 50 in the mechatronic assembly 10. The drive shaft 28 acts upon a toothed wheel 36, which is rotatably mounted in the tool head 18, in a conversion gear 46. The conversion gear 46 has a gearwheel 38, a threaded spindle 40 and a sub-assembly 44 with a screw thread. The toothed wheel 36 is coupled to the gearwheel 38. The gearwheel 38 in turn is rigidly connected to the threaded spindle 40. The threaded spindle 40 acts upon the female thread of the sub-assembly 44. The sub-assembly 44 is fastened on the working slide 22 for the cutting tool. By means of the adjusting motor 24, the working slide 22 can therefore be moved, corresponding to the double arrow 48, which causes a displacement of the cutting tool 25, according to the double arrow 50', which is mounted on the working slide 22 by means of a holding device 23.

The conversion gear 46 is a reduction gear. The conversion gear can basically also be constructed as a planetary gear or as a harmonic drive. It is possible to also provide a conversion gear between the adjusting motor and the drive shaft.

A primary coil 72, for the transmission of energy and data, is fastened on the housing 66 of the mechatronic assembly 10. Together with a secondary coil 74, which is mounted in the holder 50 for the adjusting motor 24, this primary coil forms an inductive transmission path for energy and data.

The mechatronic assembly 10 has a rotary lead-through for a function channel 54. In the mechatronic assembly 10, the function channel 54 opens into a function channel 56 which extends in a wall 57 of the holder 50 for the adjusting motor 24. It is also possible to route the function channel 56 in a recess on the housing of the holder 50. The function channel 56 is connected via a coupling element 79, designed as a threaded coupling 79, to the pipeline 76 which is routed to the tool head 18. By means of the pipeline 76, blast air or cooling fluid can be provided at the cutting tool 25 when the machine spindle 12 rotates. For this, the machine spindle 12 has a window-like opening 15 for the pipeline 76.

In the holder 50, there is also an electrical lead 39 which runs from the secondary coil 74 to the plug-in connection 81. Connected to the plug-in connection 81 is a function channel, in the form of an electrical lead 77, and an electrical lead 78 which is connected to a rotary transducer for sensing the rotational speed of the machine spindle or connected to a position transducer 84 for sensing the position of the working slide 22.

Figure 3:
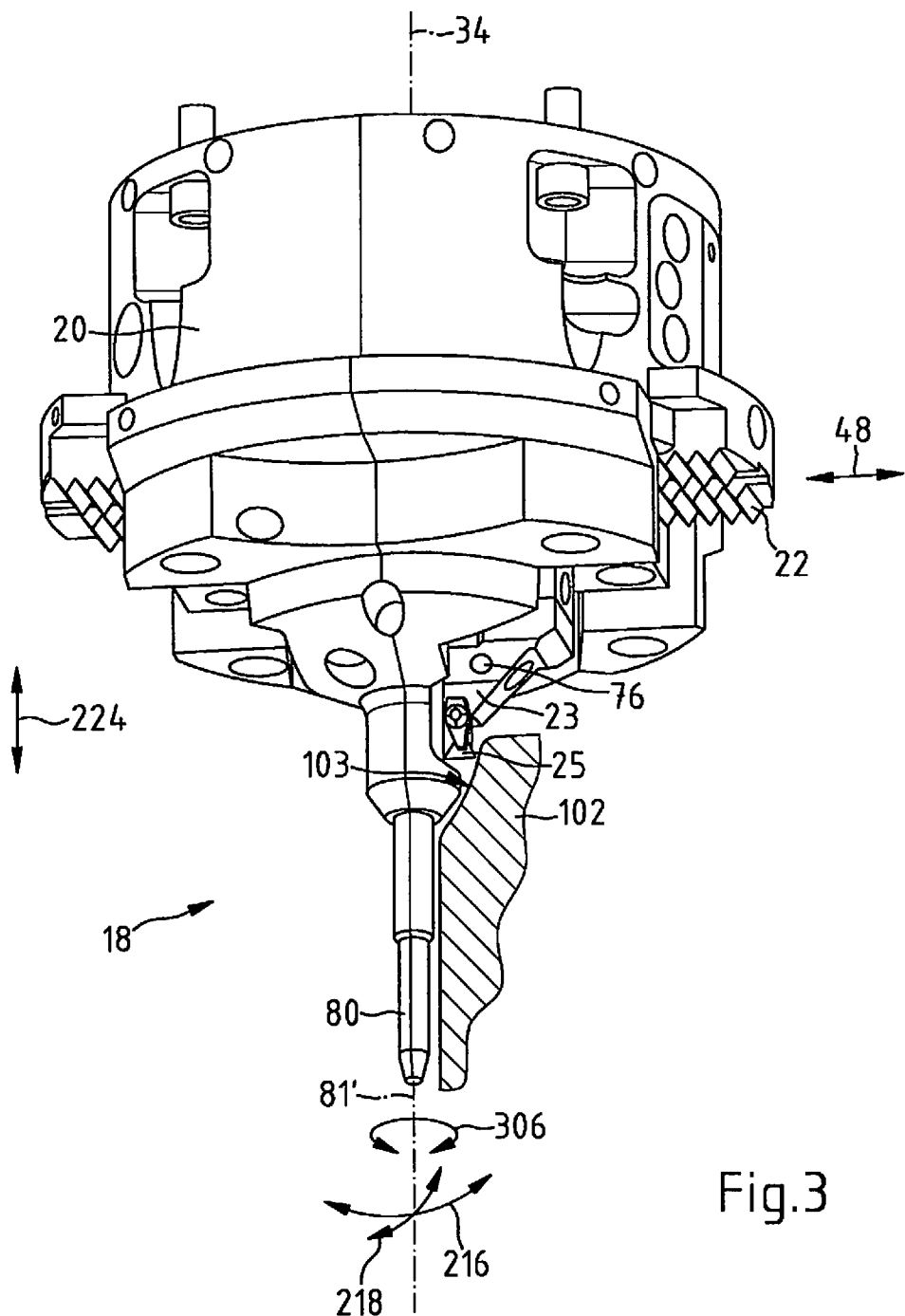
FIG. 3 shows the tool head with a cutting tool on a valve seat.

FIG. 3 shows a section of the tool head 18 with the guide pin 80 on a valve seat 102 which has an axis 81'. The cutting tool 25 is an exchangeable cutting tip. The exchangeable cutting tip 25 is mounted in a cutting tip holder 23 which is fastened on the working slide 22. The working slide 22 can be moved by means of the adjusting motor 24, according to the double arrow 48. Via the spindle motor 14, the tool head 18 can be rotated around the axis 34, corresponding to the double arrow 306. The drive unit 112, which is shown in FIG. 1, makes it possible to displace the tool head 18 together with the quill 66, according to the double arrow 224, in the direction of the rotational axis 34 of the machine spindle. In the articulated arrangement 110, the tool head can be pivoted longitudinally around the center 114, corresponding to the double arrows 216, 218. The mechatronic assembly 10 therefore enables the machining of any rotationally symmetrical surface contours 103 on a valve seat 102.

In summary, the following preferred features are to be maintained. The invention relates to a machine tool 100 for rotary machining, with which especially valve seats 102 on cylinder heads 104 can be machined. The machine tool 100 has a mechatronic assembly 10 which includes a machine spindle 12. The mechatronic assembly 10 comprises a tool head 18, mounted on the machine spindle 12, which has a basic body 20 and also at least one working slide 22, which is adjustable relative to the basic body 20, for accommodating a tool. The mechatronic assembly 10 includes an adjusting motor 24 which acts upon the working slide 22. The machine tool 100 has a carrier device 106 which accommodates the mechatronic assembly 10. The carrier device 106 comprises an articulated arrangement 110 on which the mechatronic assembly 10 can be pivoted at least around a first axis 114 and around a second axis 116 which differs from the first axis 114. The adjusting motor 24 is positioned in the mechatronic assembly 10 in such a way that the weight force $F_V$ of the adjusting motor 24 at least partially compensates that torque which the weight force $F_G$ of the tool head 18 induces when the mechatronic assembly is pivoted around the first axis 114 and around the second axis 116.

The invention claimed is:

1. A machine tool for rotary machining,
with a mechatronic assembly which has a machine spindle,
with a tool head, mounted on the machine spindle, which tool head has a basic body and also at least one working slide, which is adjustable relative to the basic body, for accommodating a tool,
with an electric adjusting motor which acts upon the working slide, and
with a carrier device which accommodates the mechatronic assembly,
characterized in that
the carrier device comprises an articulated arrangement on which the mechatronic assembly can be pivoted at least around a first axis and around a second axis which differs from the first axis,
wherein the adjusting motor is positioned in the mechatronic assembly in such a way that the weight force ($F_V$) of the adjusting motor at least partially compensates that torque which the weight force ($F_G$) of the tool head induces when the mechatronic assembly is pivoted around the first axis and/or around the second axis.

2. The machine tool as claimed in claim 1, characterized in that the articulated arrangement is designed as a ball joint which has a ball center around which the mechatronic assembly can be pivoted.

3. The machine tool as claimed in claim 2, characterized in that the mass center of gravity of the adjusting motor is arranged on the side of the ball center which faces away from the tool head.

4. The machine tool as claimed in claim 2, characterized in that the ball joint has a joint body which is supported in an air bearing or a hydrostatic bearing or which is magnetically supported in a magnetic bearing.

5. The machine tool as claimed in claim 4, characterized in that means are provided for the clamping and/or the locking of the articulated body of the ball in the bearing.

6. The machine tool as claimed in claim 1, characterized in that the mechatronic assembly has an electric spindle motor which drives the machine spindle and comprises a rotor which is rotatably coupled to the machine spindle, wherein the adjusting motor has a rotor which acts upon the working slide, and wherein the rotational axis of the rotor of the spindle motor and the rotational axis of the rotor of the adjusting motor align with the rotational axis of the machine spindle.

7. The machine tool as claimed in claim 6, characterized in that the machine spindle is supported by at least a first pivot bearing and a second pivot bearing in a housing and connected in a rotation-resistant manner to the stator of the spindle motor, wherein the spindle motor acts upon the machine spindle between the first pivot bearing and the second pivot bearing.

8. The machine tool as claimed in claim 7, characterized in that the housing has an operating section for a drive unit for displacing the mechatronic assembly in the direction of the rotational axis of the machine spindle.

9. The machine tool as claimed in claim 8, characterized in that the operating section is designed as a toothed rack.

10. The machine tool as claimed in claim 7, characterized in that for the transmission of energy and data a primary coil is fastened on the housing and together with a secondary coil, which is fastened on a holder, fixedly connected to the machine spindle, for the adjusting motor, forms an inductive transmission path for energy and data.

11. The machine tool as claimed in claim 7, characterized in that the housing is formed as a quill.

12. The machine tool as claimed in claim 6, characterized in that the adjusting motor is arranged on a side of the spindle motor which faces away from the tool head.

13. The machine tool as claimed in claim 6, characterized in that the machine spindle is designed as a hollow spindle through which passes a drive shaft, which is rotatably coupled to the rotor of the adjusting motor, for the movement coupling of working slide and adjusting motor.

14. The machine tool as claimed in claim 13, characterized in that the adjusting motor acts upon the working slide in an adjusting direction via gearing means which are connected to the drive shaft.

15. The machine tool as claimed in claim 14, characterized in that the gearing means comprise a conversion gear, arranged in the tool head, which converts a rotational movement of the drive shaft into a linear movement of the working slide.

16. The machine tool as claimed in claim 14, characterized in that the gearing means comprise a reduction gear, which converts the rotational movement of the rotor of the adjusting motor.

17. The machine tool as claimed in claim 16, characterized in that the reduction gear is arranged in the tool head.

18. The machine tool as claimed in claim 16, characterized in that the reduction gear is arranged between the adjusting motor and the drive shaft.

19. The machine tool as claimed in claim 16, characterized in that the reduction gear is designed as a planetary gearing or as a harmonic drive.

20. The machine tool as claimed in claim 13, characterized in that the hollow spindle has an opening for a function channel.

21. The machine tool as claimed in claim 20, characterized in that the opening is of a window design.

22. The machine tool as claimed in claim 13, characterized in that the drive shaft has at least one function channel for fluid or for electrical leads for transmission of energy and/or data.

23. The machine tool as claimed in claim 22, characterized in that the drive shaft for the movement coupling of working slide and adjusting motor is designed as a hollow shaft.

24. The machine tool as claimed in claim 22, characterized in that the function channel is for cooling lubricant.

25. The machine tool as claimed in claim 6, characterized in that the rotor has a hollow shaft geometry.

26. The machine tool as claimed in claim 1, characterized in that the adjusting motor is arranged on a holder which is fastened on the machine spindle, which holder has a rotary lead-through for a first function channel which opens into a second function channel.

27. The machine tool as claimed in claim 26, characterized in that the stator of the adjusting motor is arranged in a stationary manner relative to the machine spindle.

28. The machine tool as claimed in claim 26, wherein the second function channel extends in a wall or recess of the holder.

29. The machine tool as claimed in claim 1, characterized in that the mechatronic assembly has at least one function channel for fluid.

30. The machine tool as claimed in claim 29, characterized in that the function channel is a pipeline or hoseline which is fixedly mounted in the mechatronic assembly and movable with the machine spindle.

31. The machine tool as claimed in claim 29, characterized in that the function channel has coupling elements for the connecting of function channel sections.

32. The machine tool as claimed in claim 29, characterized in that the function channel is for cooling lubricant and/or for electrical leads for transmission of energy and/or data for transmitting a tool position to a tool head.

33. The machine tool as claimed in claim 1, characterized in that the tool head, for the automatic aligning of the rotational axis of the machine spindle with an axis, carries a guide pin which aligns with the rotational axis of the machine spindle.

34. The machine tool as claimed in claim 33, characterized in that the automatic aligning of the rotational axis of the machine spindle is with an axis of a bore or a valve seat.

35. The machine tool as claimed in claim 1, characterized in that provision is made for a rotary transducer which senses the rotational speed of the machine spindle.

36. The machine tool as claimed in claim 1, characterized in that provision is made for a position transducer which senses the position of the working slide.

37. The machine tool as claimed in claim 1, characterized in that the articulated arrangement can be displaced horizontally and/or vertically in the carrier device.

38. The machine tool as claimed in claim 1, characterized in that a chucking device is provided for the holding of a cylinder head.

39. The machine tool as claimed in claim 1, characterized in that a rotary distributor is provided for the controllable distribution of fluid to various function channels.

40. A mechatronic assembly for a machine tool as claimed in claim 1.

41. The machine tool as claimed in claim 1, characterized in that the machine tool is for the machining of valve seats on cylinder heads.

* * * * *